US006970480B2

(12) United States Patent
van Heyningen et al.

(10) Patent No.: US 6,970,480 B2
(45) Date of Patent: Nov. 29, 2005

(54) PROTECTION SWITCHING FOR DUPLEX ATM-PON SYSTEMS

(75) Inventors: Pieter Hendrik van Heyningen, Almere (NL); Johannes H J Maessen, Huizen (NL)

(73) Assignee: Lucent Technologies Inc., Murray Hill, NJ (US)

( * ) Notice: Subject to any disclaimer, the term of this patent is extended or adjusted under 35 U.S.C. 154(b) by 850 days.

(21) Appl. No.: 09/933,062

(22) Filed: Aug. 20, 2001

(65) Prior Publication Data

US 2002/0021662 A1   Feb. 21, 2002

(30) Foreign Application Priority Data

Aug. 21, 2000   (EP)   ................................. 00307188

(51) Int. Cl.[7] .............................................. H04J 3/06
(52) U.S. Cl. ...................... 370/508; 370/519; 398/154; 375/356
(58) Field of Search ................................ 370/503, 507, 370/508, 516, 517, 519; 398/154, 155; 375/355, 375/356, 371

(56) References Cited

U.S. PATENT DOCUMENTS

| | | | | |
|---|---|---|---|---|
| 5,825,821 A | * | 10/1998 | Okuyama | .................... 375/260 |
| 5,920,410 A | | 7/1999 | Smith et al. | ................. 359/119 |
| 6,484,813 B2 | * | 11/2002 | Tapio et al. | ............. 172/701.1 |
| 6,680,905 B1 | * | 1/2004 | Ishikawa | .................... 370/228 |

FOREIGN PATENT DOCUMENTS

| | | | |
|---|---|---|---|
| EP | 0 566 241 A2 | 3/1993 | .............. H04L 1/22 |
| EP | 0 644 704 A2 | 9/1994 | .......... H04Q 11/00 |

OTHER PUBLICATIONS

Groote, Dedecker, Louagie, and Slabbinck, "Redundancy and protection-switching in APON systems", *Broadband Access and Technology*, pp. 119-126 (1999).

Tatsuno and Tokura, "Hitless Path Protection Switching Techniques for ATM Networks", *Electronics and Communications in Japan*, Part 1, vol. 77, No. 8, pp. 13-23 (1994).

* cited by examiner

*Primary Examiner*—Bob A. Phunkulh
(74) *Attorney, Agent, or Firm*—M. J. Hodulik

(57)    ABSTRACT

A terminal device is provided for communicating data signals with a central communication device via a first signal carrying line and a second signal carrying line. The first signal carrying line is arranged for transporting a first signal and the second signal carrying line is arranged for transporting a second signal, wherein the first and second signals have equal content. The first signal carrying line has a first propagation time and the second signal carrying line has a second propagation time, such that the first propagation time is shorter than the second propagation time. The terminal device includes a signal quality comparison element for determining a first signal quality of the first signal and a second signal quality of the second signal, for comparing the first and second signal qualities, and for accepting the one of the first and second signals that has a better quality.

8 Claims, 7 Drawing Sheets

PROTECTION SWITCHING FOR DUPLEX ATM-PON SYSTEMS

CROSS-REFERENCE TO RELATED APPLICATION

This application claims priority of European Patent Application No. 00307188.3, filed on Aug. 21, 2000, which is incorporated herein by reference in its entirety.

TECHNICAL FIELD

The invention relates generally to passive optical networks (PONs) employing asynchronous transfer mode (ATM) transmission and, more particularly, to protection switching in such networks.

BACKGROUND OF THE INVENTION

Asynchronous Transfer Mode (ATM) systems provide communication services over high speed, high capacity networks. The communication services can comprise various protocols for data-communication, e.g. telephone services as public switched telephone network (PSTN) and integrated services data network (ISDN), digital video/audio broadcasting, Internet services, and so on. In one type of network configuration, an ATM switch capable of transmitting and receiving data may be connected to a range of subscribers to the communication services in a point-to-multipoint architecture ("branched tree") through a passive optical access network (PON). The requirements and specifications for the physical layer of ATM-PON systems are described in more detail in "Recommendation G.983.1" of the International Telecommunication Union (ITU-G.983.1).

In a typical network, the ATM switch is connected to the PON through an optical line terminal (OLT). Subscribers are connected to the PON through an optical network termination (ONT), which acts as an interface between the subscriber's electronic network and the optical network. Data is sent bi-directionally over the network, using different wavelengths for upstream and downstream traffic. The ATM switch transmits data frames (each containing 56 data cells, each cell containing 53 bytes) downstream to all ONTs in the network. For the upstream direction from an ONT to the ATM switch, a data frame contains 53 data cells each containing 53 bytes plus 3 bytes for traffic management. The use of an information header in the data frame and an encryption method ensures the reception of the data by only the addressed subscriber. Upstream data transmission from an ONT to the ATM switch must be synchronized with transmissions of other ONTs in the network, which is controlled by the OLT using a grant scheme by a Time Division Multiple Access (TDMA) technique. However, due to the difference in fiber length between the OLT and each of the ONTs, the propagation time delay between signals from different ONTs must be taken into account in order to avoid collisions between upstream data frames from different ONTs. Furthermore, ONTs may exhibit an equipment-related time-delay difference. Thus, for each ONT, an equalization time delay value is established during a ranging procedure. This delay value, specific for each ONT, is used to set all ONTs at an equal "virtual distance" from the OLT in order to obtain an internal timing reference for all upstream transmissions in the network.

To enhance the reliability of an optical network, an ATM-PON system can be arranged with a protection architecture. ITU-G.983.1 (appendix D) describes optional protection schemes for network architectures in which the connection of ONTs to an ATM switch is fully established through two different passive optical networks. Additionally, European patent application filed on (Lucent's reference: JNL-233-B-004), describes a PON architecture that allows a mix of protected and unprotected connections.

When in a protected or mixed architecture and a malfunction occurs in a protected connection in one of the networks, the data traffic can be switched to the other still functioning network and continue. Disadvantageously, however, due to a switching delay, a protection switch will not be hitless in the aforementioned protection architectures (i.e. without loss of data), which may severely disturb data traffic. In some protection architectures arranged with two separate networks, it is not possible to have any signals in the second of the two networks during operation of the first network due to the optical coupling arrangement of the two networks. In such a case, the second network is in a so-called cold stand-by, e.g., the laser source of the second (spare) network must be off. When a protection switch occurs, switching on the laser causes a delay and loss of data. In other protection architectures, hot stand-by (laser on) is possible, but loss of data by a malfunction can still occur, since the data traffic in the first optical network is either not synchronized with the data traffic in the second network, or the detection of the malfunction is slow in comparison with the data transmission rate of the networks.

SUMMARY OF THE INVENTION

According to the principles of the invention, an arrangement and a method are provided for a protection switch in an ATM-PON system that can reliably switch between PONs in a hitless or near-hitless manner, e.g., with minimal loss of data and within a maximum protection switch time of 50 milliseconds (ms) as specified by ITU recommendation G.783. Moreover, protection switching according to the principles of the invention performs a per-cell selection of data based on the quality of the received data cells on each passive optical network of the protected PON pair.

More specifically, embodiments of the invention are directed to a terminal device arranged for communicating data signals with a central communication device via a first data signal carrying line and a second data signal carrying line. In one exemplary configuration, the terminal device is a protected optical network terminal in a protected optical network architecture, and the first data signal carrying line and the second data signal carrying line are optical network fibers.

The first data signal carrying line is arranged for transporting a first data signal and the second data signal carrying line is arranged for transporting a second data signal, wherein the first and second data signals have the same (equal) content. The first data signal carrying line has a first signal propagation time and the second data signal carrying line has a second signal propagation time, such that the first signal propagation time is shorter than the second signal propagation time. The terminal device comprises signal quality comparison means for determining a first signal quality of the first data signal and a second signal quality of the second data signal, for comparing the first and second signal qualities, and for accepting the one of the first and second data signals that has a better quality. According to the principles of the invention, the terminal device further comprises a first data signal buffer for storing a data signal. The terminal device stores the first data signal in the first data signal buffer during a first synchronization period to synchronize at least the reception of the first data signal and the second data signal. According to one embodiment, the first synchronization period equals the time difference between the second data signal propagation time and the first data signal propagation time.

According to another illustrative embodiment, the terminal device includes a second data signal buffer for storing a third data signal during a second synchronization period to synchronize transmission of the third data signal with transmission of a fourth data signal, wherein the third data signal is to be transmitted via the first data signal carrying line and the fourth data signal is to be transmitted via the second data signal carrying line. The third and fourth data signals have the same (equal) content. In one embodiment, the second synchronization period equals the time difference between the second data signal propagation time and the first data signal propagation time.

According to another aspect of the invention, the central communication device, which communicates data signals with at least one terminal device, comprises a grant controller for controlling transmission of the first data signal from the at least one terminal device by transmitting a first grant signal to the at least one terminal device over the first data signal carrying line and for controlling transmission of the second data signal from the at least one terminal device by transmitting a second grant signal to the at least one terminal device over the second data signal carrying line. The grant controller is arranged to transmit the first and second grant signals at the same instant in time to the at least one terminal device.

The method according to one illustrative embodiment of the invention can be performed at a terminal device and includes receiving a first data signal from the central communication device, storing the first data signal in a first data signal buffer, receiving a second data signal from the central communication device, and holding the first data signal in the first data signal buffer during a first synchronization period to synchronize at least the reception of the first and the second data signals. According to another illustrative embodiment, a third data signal is stored in a second data signal buffer and a fourth data signal is transmitted to the central communication device via the second data signal carrying line. The third data signal, which is stored in the second data signal buffer, is then transmitted to the central communication device via the first data signal carrying line after the second synchronization period in order to synchronize transmission of the third and the fourth data signals.

BRIEF DESCRIPTION OF THE DRAWINGS

A more complete understanding of the present invention may be obtained from consideration of the following detailed description of the invention in conjunction with the drawing, with like elements referenced with like reference numerals, in which.

DETAILED DESCRIPTION

The following list of acronyms and associated definitions will be used throughout the detailed description that follows:

| | |
|---|---|
| ADB | adaptive data buffer |
| ATM | asynchronous transfer mode |
| CB | cell buffer unit |
| CDD | cell delineation and descrambling unit |
| CF | cell filter unit |
| CM(A/B) | cell merger unit |
| CQ | cell queue |
| CR | cell recovery unit |
| DC | data conversion unit |
| DPU | data packaging unit |
| DPSC | downstream protection switch control unit |
| ERR | error |
| FIFO | first in first out buffer |
| FRML | loss of PLOAM frame synchronization |
| GC-(A/B) | grant control code input (PON-A/PON-B) |
| GDTI | grant delay time insertion unit |
| GG(A/B) | grant generator |
| GGP | protected grant generator |
| GIS | grant insertion scheduler |
| GR | grant signal |
| IL | LAN interface |
| IP(A/B) | interface to physical layer unit (PHYA/PHYB) |
| ISDN | integrated services data network |
| LAN | local area network |
| LCD | loss of cell delineation |
| LOS | loss of signal |
| LTA | lookup table array |
| MAC | medium access control |
| MAGG | medium access control grant generator |
| NI | network interface |
| OAML | loss of Operations Administration and Maintenance data |
| OLT | optical line terminal |
| ONT | optical network terminal |
| OR | optical receiver (in ONT) |
| ORU | optical receiver (in OLT) |
| OSU | optical network subscriber unit |
| OT | optical transmitter |
| PCA | PLOAM cell analysis unit |
| PCI | PLOAM cell insertion unit |
| PHY(A/B) | Physical layer unit (A/B) |
| PLOAM | Physical Layer Operations Administration and Maintenance |
| PON | passive optical network |
| PON-LT | passive optical network line terminal (optical line interface) |
| PSCU | protection switch control unit |
| PSTN | public switched telephone network |
| R-ONT | receiver part of ONT |
| SC | signal converter |
| SCI(A/B) | upstream slot code input (PON-A/PON-B) |
| T-ONT | transmitter part of ONT |
| $Td_{ji}$ | equalization time delay ($Td_{A1}$, $Td_{B1}$) for an optical network terminal (ONTi) in a passive optical network PON-j, (ONT1 in PON-A, ONT1 in PON-B, etc.) |
| Tp | propagation time delay |
| Ts | internal equipment delay time |
| TVD(A/B) | time delay buffer (PON-A/PON-B) |
| UNI | user network interface |
| UPSC | upstream protection switch control unit |
| Trtvd | round-trip delay at predetermined virtual distance |
| ATd | buffer time delay |

Figure 1:
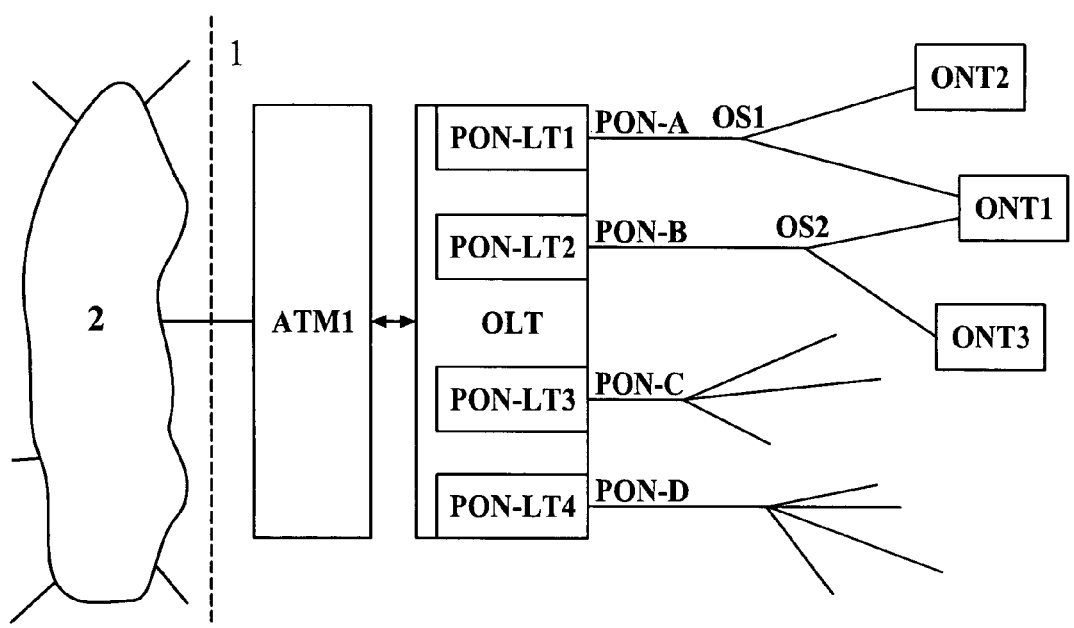
FIG. 1 shows a schematic overview of a prior art network architecture of two passive optical networks comprising a plurality of protected and unprotected connections between an optical line terminal (OLT) and multiple optical network terminals (ONTs)

To achieve a (near) hitless protection switch in a protected or mixed passive optical network architecture, embodiments of the invention provide an arrangement and method as will be described below. In FIG. 1, a prior art passive optical network architecture 1 is shown, which comprises an Asynchronous Transfer Mode switch ATM1, which is connected to a backbone network 2 and to a plurality of optical network terminals (ONTs) through passive optical networks PON-A, PON-B, PON-C and PON-D. ATM switch ATM1 comprises an optical line terminal OLT, in which a plurality of line terminals (interfaces) PON-LT1 PON-LT2, PON-LT3, PON-LT4 are located. Line terminals PON-LT1, PON-LT2, PON-LT3 and PON-LT4 are coupled to the passive optical networks PON-A, PON-B, PON-C and PON-D, respectively. For reasons of clarity, only connections on PON-A and PON-B are shown. On networks PON-A and PON-B, a plurality of optical network terminals ONT1, ONT2, ONT3 are connected in a point-to-multipoint configuration ("tree and branch topology") through optical splitters OS1 and OS2. To provide a protected connection between ATM switch ATM1 and terminal ONT1, terminal ONT1 is connected to both networks PON-A and PON-B. In network architecture 1, unprotected connections may also exist for terminal ONT2 in network PON-A and terminal ONT3 in network PON-B, respectively. It will be appreciated that within the limits of the network architecture, any number of optical networks interfaced with ATM switch ATM1 may be possible. It is to be understood that also within the limits of the network architecture, any combination of protected and unprotected optical network terminals may be present.

In a protected network architecture 1, passive optical networks PON-A and PON-B preferably encompass geographically different routes to minimize failure probability due to mechanical damage to the fiber cables, e.g., cable cuts. It will be appreciated that, in this network architecture, a data frame to a protected network terminal ONT1 is transmitted over both networks PON-A and PON-B. That is, both networks are active simultaneously.

Figure 2:
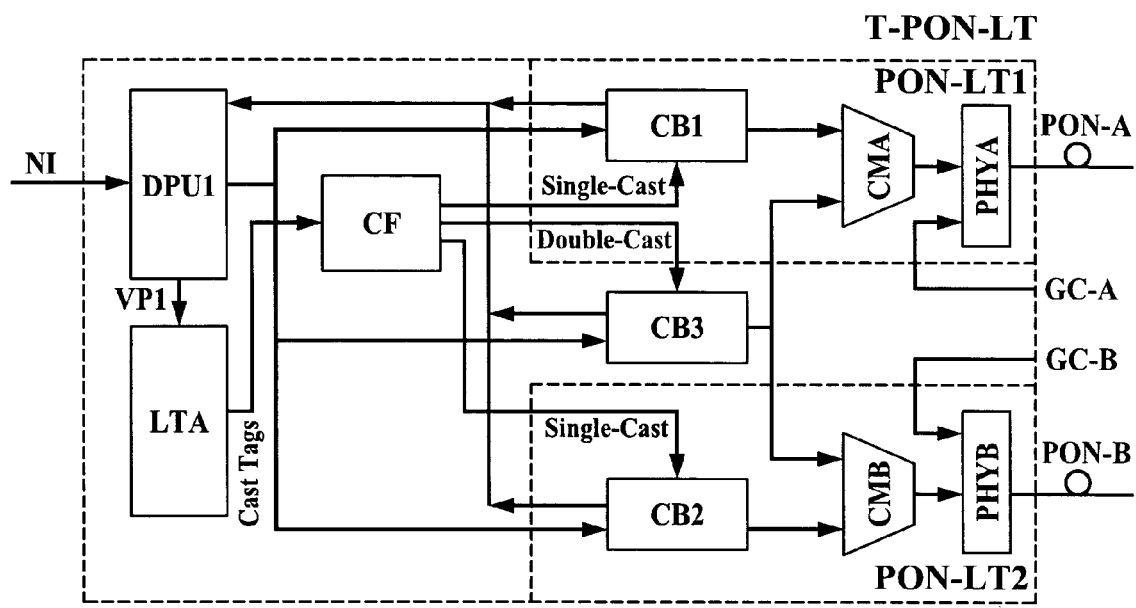
FIG. 2 shows an example of an OLT downstream cell bridge for a protected connection.

FIG. 2 shows a schematic block diagram of an optical line terminal OLT to transmit data downstream, comprising a network interface NI, a data packaging unit DPU1, Lookup Table Array LTA, Cell filters CF, Cell Buffers CB1, CB2, CB3, Cell Mergers CMA, CMB and physical layer units PHYA, PHYB.

In the OLT unit, data from ATM switch ATM1 entering electronically from backbone 2 (FIG. 1) through interface NI, is transmitted into one or both of the optical networks PON-A, PON-B. Data packaging unit DPU1 determines, in conjunction with the virtual path identification lookup table array LTA, whether the data must be sent to a protected terminal ONT1 or an unprotected terminal ONT2, ONT3. If an unprotected terminal must be addressed on network PON-A or PON-B, the cell filters (CF) activate a cell buffer CB1 or CB2 for a transmission to an unprotected terminal ONT2 or ONT3, respectively. In case a protected terminal ONT1 is addressed, cell buffer CB3 is activated. Subsequently, the data is transferred to the respective cell buffer CB1, CB2, CB3 and through a cell level handshaking mechanism sent at the appropriate time to the respective cell mergers CMA and/or CMB. Finally, physical layer units PHYA, PHYB handle the conversion of data from the electronic domain to the optical domain, including churning, scrambling and insertion of grants in the downstream PLOAM (Physical Layer Operations Administration and Maintenance) cells for network operation and management through grant control code inputs GC-A, GC-B. The insertion of grants in the downstream PLOAM cells will be described in more detail below with reference to FIG. 7.

Due to differences in fiber length in networks PON-A and PON-B between ATM switch ATM1 and each of the network terminals ONT1, ONT1, ONT3, differences in propagation delays will exist for signals travelling between ATM switch ATM1 and each of the network terminals ONT1, ONT2, ONT3. Each network terminal ONT1, ONT2, ONT3 is provided with an equalization time delay to provide synchronization within one passive optical network. In each network terminal ONT1, ONT2, ONT3, the specific value for the equalization time delay is used to set each terminal at a virtual distance from the ATM switch, so that it is equal for each network terminal. A network terminal ONT1, ONT2, ONT3 delays its transmission of a data signal during a time-span equal to the equalization time delay in order to synchronize its data traffic with the data traffic of other network terminals. As described by ITU-G.983.1, in each network PON-A, PON-B for each network terminal ONT1, ONT2, ONT3, the equalization time delay is determined during a ranging procedure.

The equalization time delay $Td_{ji}$ for an optical network terminal ONTi in a passive optical network PON-j is given by:

$$Td_{ji} = Trtvd_j - (2*Tp_j + Ts),$$

where $Trtvd_j$ is the round-trip delay at a predetermined virtual distance between the optical line interface PON-LTj and the network terminal ONTi in optical network. PON-j, $Tp_j$ is the actual propagation delay time between the network terminal ONTi and the optical line interface PON-LTj in PON-j, and Ts is the intrinsic equipment delay time due to internal latency in the network terminal ONTi, respectively.

From this equation, it follows that the shorter the actual distance between the optical line terminal OLT and the optical network terminal ONTi, the longer the equalization delay time $Td_{ji}$.

In the present invention, an arrangement on the downstream side is provided for a protection switch between optical networks PON-A and PON-B. Principally, identical data frames sent to the network terminal ONT1 over both PON-A and PON-B need to be compared to identify possible errors and/or malfunctions on one of the respective networks. Although each network PON-A, PON-B is internally synchronized, data transmitted from ATM switch ATM1 to a protected optical network terminal ONT1 will most probably not be received at ONT1 in the same instant through both networks PON-A and PON-B due to the difference in the propagation delay between the optical networks (i.e. the equalization time delay for ONT1 in network PON-A will not be equal to the equalization time delay for ONT1 in network PON-B: $Td_{A1} \neq Td_{B1}$). Thus, nearly hitless protection switching for a possible malfunction in one of the networks is difficult to achieve. Advantageously, synchronization between the two networks PON-A and PON-B at a network terminal ONT1 can be obtained by providing an adaptive buffer on the network terminal for buffering data signals propagating over the network with the larger equalization time delay until the same data signal propagating over the network with the smaller equalization time delay has arrived. The adaptive buffer will be described further below with reference to FIGS. 4 and 5.

From the ranging procedures on network PON-A and PON-B, the equalization time delay $Td_{A1}$, and $Td_{B1}$, respectively, for a protected network terminal ONT1 are known. On the network with the larger equalization delay time ("shorter propagation time, shorter distance"), data will be received earlier than through the other "longer" network.

The incoming frames from the "shorter" network must be buffered during a time of ΔTd until the same data is received through the "longer" network. The buffering time ΔTd for downstream data traffic in a protected optical network terminal ONTi connected to networks PON-j and PON-k is derived from the equalization time delay values (based on round-trip delays) for the network terminal ONTi in network PON-j and PON-k, respectively, and given by the following equation:

$$\Delta Td=(Td_{ji}-Td_{ki})/2,$$

where $Td_{ji}>Td_{ki}$.

Since the distance between each optical network terminal ONTi and the optical line terminal in the respective networks is "scaled;" by the ranging procedure to the same virtual distance with the same virtual round-trip delay Trtvd, the difference ΔTd can be used as buffer time delay to synchronize incoming data from both optical networks.

Figure 3:
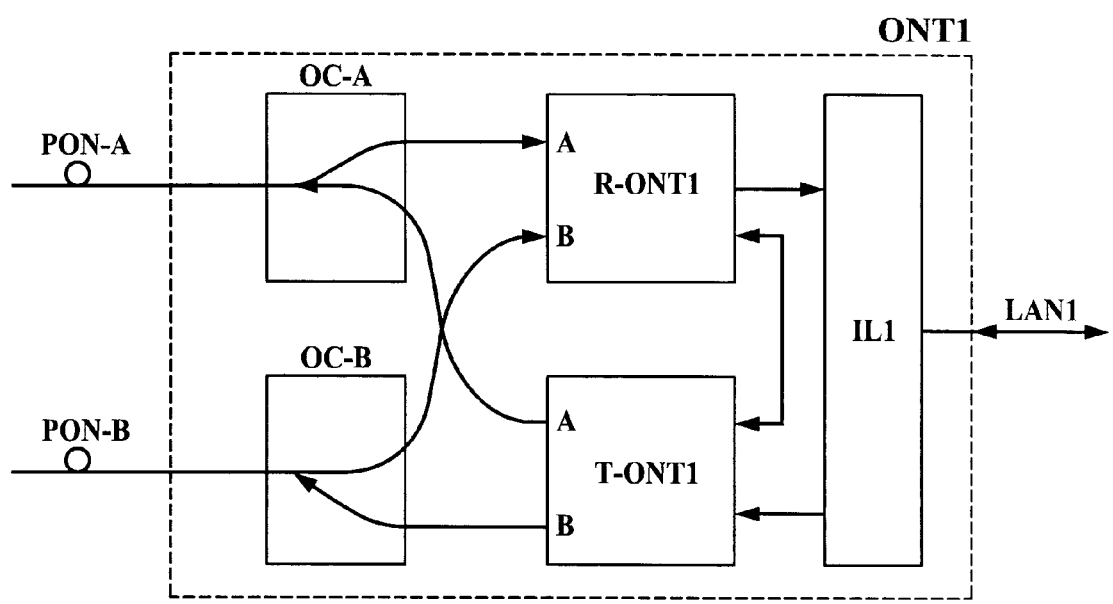
FIG. 3 shows a schematic block diagram of a protected ONT.

In FIG. 3, a schematic block diagram of a protected optical network terminal ONT1 is shown. The network terminal ONT1 is connected to optical network PON-A and to optical network PON-B. The optical network terminal ONT1 comprises a receiver part R-ONT1 for reception of data signals from both networks PON-A and PON-B and a transmitter part T-ONT1 for transmission of data signals to both networks PON-A and PON-B. The optical network terminal ONT1 further comprises optical coupling devices OC-A and OC-B for coupling the receiver part R-ONT1 and transmitter part T-ONT1 to the networks PON-A and PON-B, and an interface IL1 to a data-communication network, for example a local area network LAN1. The receiver part R-ONT1 and transmitter part T-ONT1 are interlinked for exchange of control signals, as will be described below. The local area network LAN1 facilitates telephony and data-communication services as known in the art for data communication devices such as personal computers and the like.

Figure 4:
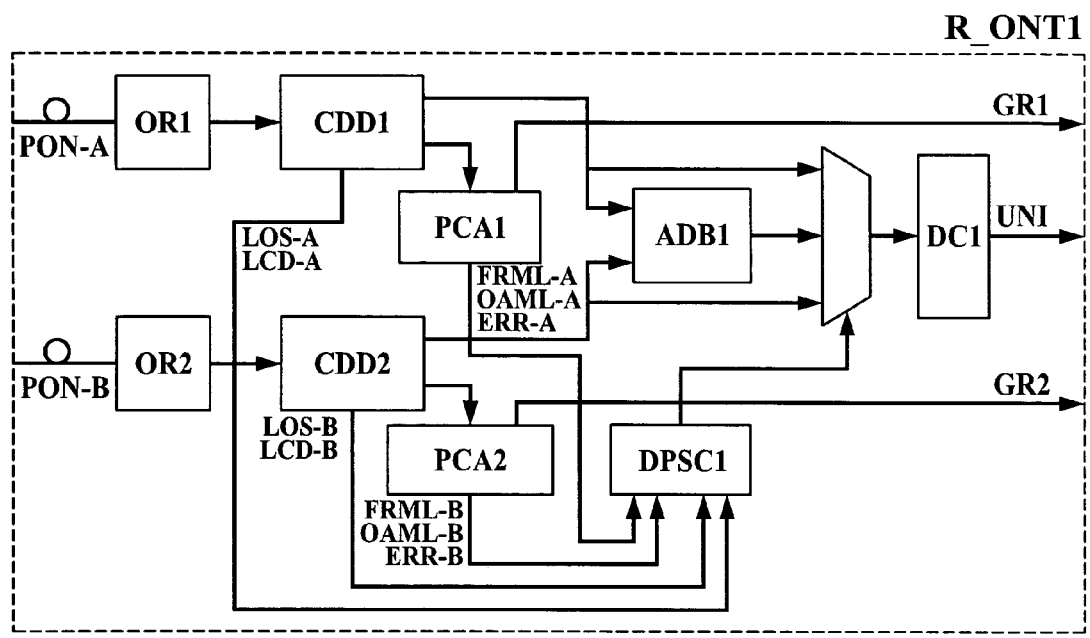
FIG. 4 shows diagrammatically an ONT downstream receiver for a protected connection in a passive optical network (PON) pair.

In FIG. 4, a schematic block diagram of the receiver R-ONT1 of a protected optical network terminal ONT1 is shown.

Receiver R-ONT1 comprises, for each optical network PON-A, PON-B, an optical receiver unit OR1, OR2, a cell delineation and descrambling unit CDD1, CDD2 coupled to a PLOAM cell analysis unit PCA1, PCA2. The receiver also includes an adaptive delay buffer ADB1 comprising a memory to store data, a downstream protection switch control unit DPSC1 and a data conversion unit DC1.

Data from optical network PON-A, and PON-B are received by optical receivers OR1 and OR2, respectively, and converted from the optical to the electronic domain. From the receiver OR1, OR2, the data are sent to the cell delineation and descrambling units CDD1, CDD2 and analyzed for loss of signal LOS-A, LOS-B and loss of cell delineation LCD-A, LCD-B.

Coupled to CDD1, CDD2, the PLOAM cell analysis units PCA1, PCA2, check the received PLOAM data for errors ERR-A, ERR-B, loss of PLOAM frame synchronization FRML-A, FRML-B, and loss of Operations Administration and Maintenance data OAML-A, OAML-B. The PLOAM cell analysis units PCA1, PCA2 send their error-related data to the downstream protection switch control unit: DPSC1. Grant information GR1, GR2 for upstream transmission to the respective optical line interface PON-LT1, PON-LT2 is sent to the transmitter part of the optical network terminal T-ONT1 (i.e. the grant delay time insertion units GDTI1 and GDTI2, shown in FIG. 5).

Based on the equalization delay time determined for each optical network PON-A, PON-B during the ranging procedure, the cell delineation and descrambling units CDD1, CDD2 send the received data to the adaptive data buffer ADB1 or directly to the data conversion unit DC1. The data received as a data packet through the network with the larger equalization time delay (e.g. PON-A) is buffered in the adaptive data buffer ADB1 until arrival of the same data received as a data packet through the optical network with the smaller equalization time delay (e.g. PON-B).

Based on the possible errors detected by the cell delineation and descrambling units CDD1, CDD2, and the PLOAM cell analysis units PCA1, PCA2 (i.e. LOS-A, LOS-B, LCD-A, LCD-B, ERR-A, ERR-B, FRML-A, FRML-B, and OAML-A, OAML-B), the downstream protection switch control unit DPSC1 determines which one of the data packets received through PON-A and PON-B will be used to pass on to the data conversion unit DC1 for a further processing step as known by persons skilled in the art (i.e. decryption, translation of header information, etc.). In case both data packets are error-free, either one of the received data packets can be passed on. In case only one of the data packets is error-free, the downstream protection switch control unit DPSC1 will select the error-free data packet.

Figure 5:
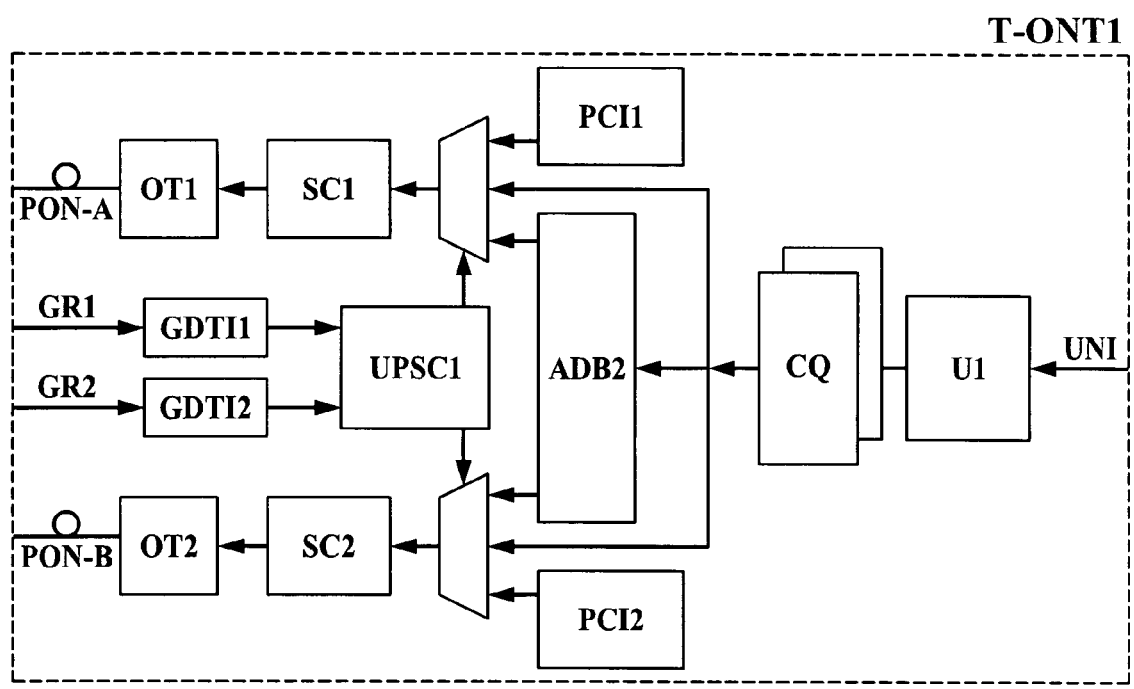
FIG. 5 shows diagrammatically an ONT upstream transmitter for a protected connection in a PON pair.

In FIG. 5 a block diagram schematically depicts an upstream transmitter part T-ONT1 of a protected optical network terminal ONT1. The transmitter part T-ONT1 comprises a user network interface UNI, a data packaging unit U1, a cell queue CQ, an adaptive delay time buffer ADB2, an upstream protection switch control unit UPSC1, PLOAM cell insertion units PCI1, PCI2, signal converter units SC1, SC2, optical transmitters OT1, OT2, and grant delay time insertion units GDTI1, GDTI2.

Data to be transmitted, enter the transmitter part T-ONT1 through the UNI interface. The data packaging unit U1 determines the ATM traffic category for the data frame. Also, the data packaging unit U1 arranges the data into data frames, in which a data header is also inserted. A data frame is then sent to the cell queue unit CQ where the data frame is stored per category. When transmission is granted by the OLT, the optical line interfaces PON-LT1, PON-LT2 send grant signals in a PLOAM signal over PON-A, PON-B respectively to the receiver part R-ONT1 of ONT1. From the PLOAM signals received through PON-A and PON-B, the respective PLOAM analysis unit PCA1, PCA2 generate a grant signal GR1, GR2, respectively, which are sent to the transmitter part T-ONT1 (see FIGS. 3 and 4). In T-ONT1, the grant signals GR1, GR2 from PCA1 and PCA2 are sent to the grant delay time insertion units GDTI1 and GDTI2, respectively. The upstream protection switch control unit UPSC1 now monitors grant delay time insertion units GDTI1 and GDTI2 to regulate the transmission of a data frame waiting in cell queue CQ.

The transmission of a data frame waiting in cell queue CQ is now granted by the signal from the "longer" optical network with the smaller equalization time delay (e.g. PON-B). The transmission for the "shorter" optical network with the larger equalization time delay (e.g. PON-A) must still be delayed for a time ΔTd, in order for the data frame to arrive at the optical line terminal in sync with the same data frame transmitted over the "longer" network. The additional delay is achieved by the implementation of an adaptive delay time buffer ADB2. Similarly, as for the implementation of the adaptive delay time buffer ADB1 in the receiver part of the optical network terminal R-ONT1, the upstream protection switch control unit UPSC1 determines during the ranging procedure which optical network to buffer with the appropriate buffer time delay ΔTd.

Both the data directly transmitted over the "longer" network and the same data transmitted with a delay over the "shorter" network are further processed as known in the art. For example, the data are merged with PLOAM cells and minislots by units PCI1 and PCI2, converted (scrambled) by signal converters SC1 and SC2 and, finally, converted from the electronic to the optical domain by the optical transmitters OT1 and OT2.

It should be noted that, since GDTI1 and GDTI2 do not buffer their respective grant data GR1 and GR2 in the adaptive delay buffer ADB2, the grant delay time insertion units GDTI1 and GDTI2 must delay the respective grant signals GR1 and GR2 internally with a delay $Td_{A1}$+Ts and $Td_{B1}$+Ts equal to the sum of the equalization time delay $Td_{A1}$, $Td_{B1}$, for the respective network, and the intrinsic equipment delay Ts of the optical network terminal ONT1. The delay time used by the grant delay time insertion units GDTI1 and GDTI2, respectively, is also applied in, unprotected optical network terminals ONT2, ONT3, as known to persons skilled in the art.

Figure 6:
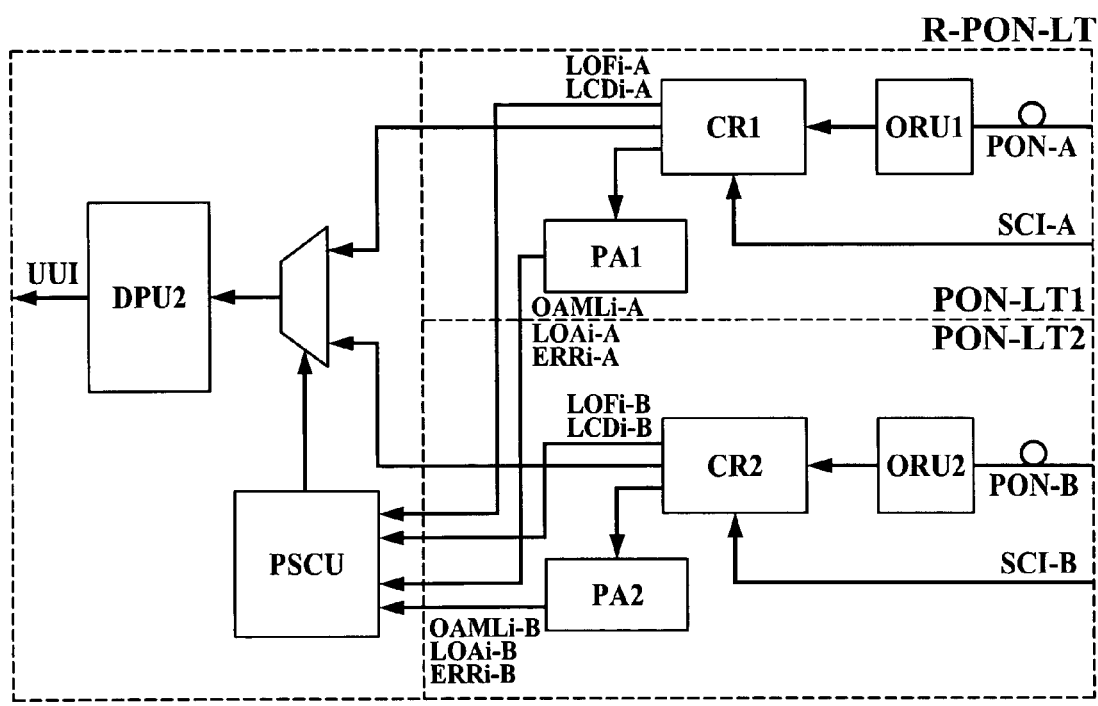
FIG. 6 shows diagrammatically a PON line terminal (PON-LT) protection switch for a protected connection in a PON pair.

In FIG. 6, the receiver part R-PON-LT of an optical line terminal OLT is schematically shown as a block diagram. The receiver part R-PON-LT of the OLT comprises a data packaging unit DPU2 connected to ATM switch ATM1, a protection switch control unit PSCU, and optical line interfaces PON-LT1 and PON-LT2 which are connected to the passive optical networks PON-A and PON-B, respectively. In PON-A, optical line interface PON-LT1 comprises an optical receiver ORU1, a cell recovery unit CR1, an upstream slot code input SC1A and a PLOAM analysis unit PA1. Similarly, in PON-B, optical line interface PON-LT2 comprises an optical receiver ORU2, a cell recovery unit CR2, an upstream slot code input SC1B and a PLOAM analysis unit PA2.

Due to the timing of the transmission of data by the optical network terminal ONT1, the data will be received synchronously by the optical receivers ORU1 and ORU2 of the optical line interface PON-LT1 and PON-LT2, respectively. Optical receiver ORU1, ORU2 converts the optical signal comprising the data to the electronic domain and sends the data to the cell recovery unit CR1, CR2 which recovers the data with information data (expected cell code information ECCI) received through the upstream slot code input SCIA, SCIB from the medium access grant generation processor MAGG. The MAGG will be described below in more detail with reference to FIG. 7. Cell recovery unit CR1, CR2 determines the loss of signal LOSi-A, LOSi-B and the loss of cell delineation LCDi-A, LCDi-B for each protected optical network terminal ONTi, individually. The necessary information for the particular protected network terminal ONTi in which the loss occurred is derived from the expected cell code information ECCI and received through the upstream slot code input SCIA, SCIB.

The PLOAM analysis unit PA1, PA2 recovers the PLOAM cells, minislots and ranging cells from the data frame. Also, for each; data frame, the PLOAM analysis unit PA1, PA2 determines the occurrence of errors ERRi-A, ERRi-B, loss of PLOAM frame synchronization FRMLi-A, FRMLi-B, and loss of Operations Administration and Maintenance data OAMLi-A, OAMLi-B, for each protected optical network terminal ONTi, individually. The necessary information for the particular protected network terminal ONTi in which the loss occurred, is derived from the expected cell code information and received through the upstream slot code input SCIA, SCIB.

Based on the possible errors detected by the cell recovery units CR1 and CR2 and the PLOAM analysis units PA1 and PA2, the protection switch control unit PSCU determines which one of the data frames received through PON-A and PON-B will be used to pass on to the data packaging unit DPU2 for further transmission over backbone network 2 (FIG. 1). In case both data frames are error-free, either one can be passed on. In case only one of the data frames is error-free, the protection switch control unit PSCU will select the error-free data frame.

To synchronize the downstream data traffic from the optical line interfaces PON-LT1 and PON-LT2 over the networks PON-A and PON-B, respectively, to a protected network terminal ONT1, it is essential that the transmission of grants by means of the PLOAM cells is synchronized as well. The grants for protected optical network ONT1 must be placed in the same field position in both upstream PLOAM cells transmitted over PON-A and PON-B, respectively. Only in this way can a specific data frame arrive simultaneously at both the optical receivers ORU1 and ORU2 of the optical line terminal OLT. The scheduling of grants in the present invention is done by a medium access grant generation processor MAGG.

Figure 7:
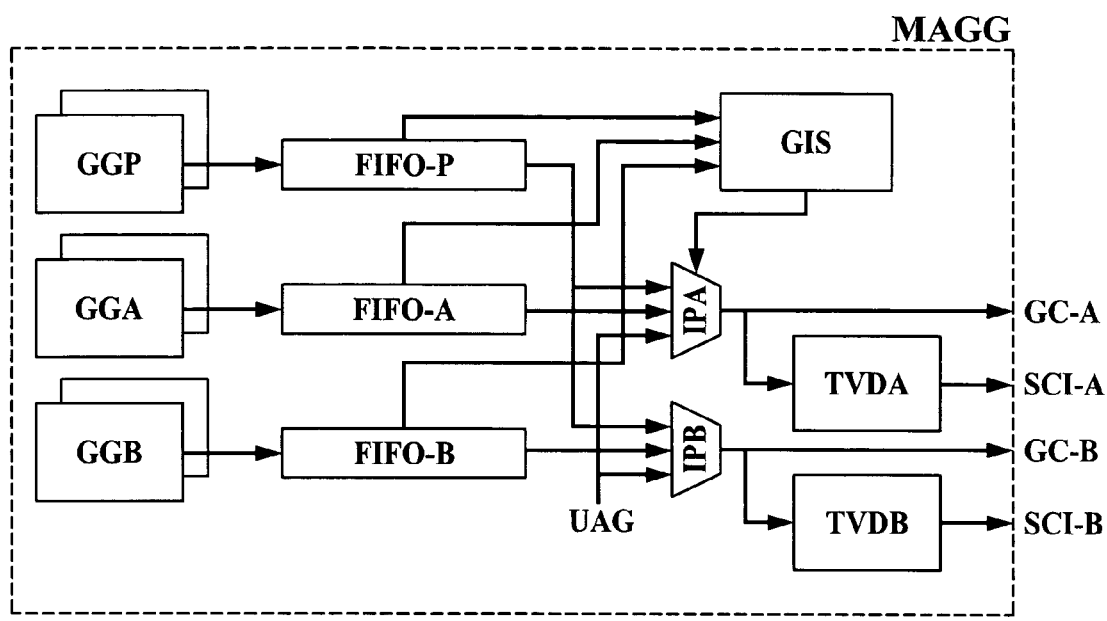
FIG. 7 shows diagrammatically a PON-LT medium access control grant generator for a protected connection in a PON pair.

In FIG. 7, a schematic block diagram of a medium access grant generation processor MAGG is shown. The medium access grant generation processor MAGG comprises interfaces IPA, IPB to the physical layer units PHYA, PHYB, a plurality of grant generators GGP for protected optical network terminals, and a plurality of grant generators GGA and GGB for unprotected optical network terminals on both optical networks PON-A and PON-B, respectively. Grant generators GGP, GGA, GGB are provided with FIFO buffers FIFO-P, FIFO-A, FIFO-B, respectively, to store the pending grants. Furthermore, the medium access grant generator processor MAGG comprises a grant insertion scheduler GIS and time delay buffers TVDA, TVDB.

For every upstream cell slot, the grant insertion scheduler GIS determines in which order the pending grants, generated in the grant generators GGP, GGA and GGB and buffered, are directed from the respective buffers FIFO-P, FIFO-A, FIFO-B into the interfaces IPA, IPB for insertion into downstream cells transmitted over PON-A and PON-B. Grants for a protected optical network terminal ONT1 are generated in grant generator GGP and simultaneously inserted in both PLOAM cells of PON-A and PON-B by sending the grants to the grant control code inputs GC-A and GC-B of the optical line terminal OLT, as shown in FIG. 2.

It should be noted that, in conjunction with the generation of grants for a protected optical network terminal ONT1, the expected cell code information data ECCI is generated for the slot code input SCIA, SCIB of the receiver part R-PON-LT of the optical line terminal OLT (FIG. 6). The data cell, to be transmitted by the protected network terminal ONT1 and related to the grants generated by the MAGG, has a round trip delay (until received by the optical line terminal OLT after the instant of transmission of the grants) equal to the virtual distance time delay Trtvd, for transmission over network PON-A and PON-B, respectively. To synchronize the expected cell code information ECCI with the arrival of the related data cell, the time delay buffers TVDA, TVDB store the expected cell code information during the round trip delay Trtvd, respectively, before sending the expected cell code information to the slot code information input SCIA, and SCIB, respectively.

Grants for unprotected optical network terminals ONT2 on PON-A and ONT3 on PON-B are generated in grant generators GGA and GGB, respectively, and sent through interfaces IPA and IPB, respectively, to the grant control code inputs GC-A and GC-B, respectively, of the optical line terminal OLT, as shown in FIG. 2. For a grant directed to an unprotected optical network terminal, the MAGG performs in a similar way. That is, for the unprotected optical network terminal ONT2 connected to the OLT over the optical network PON-A, the expected cell code information is delayed only in time delay buffer TVDA during a delay time Trtvd before sending the ECCI information to the slot code input SCIA.

Based on which grants are generated for the respective PON, PLOAM cells for unprotected optical network terminals are different for both optical networks PON-A and PON-B. If no more grants for unprotected network terminals are pending at a certain time, the grant field in the PLOAM cell is padded with an unassigned grant UAG in order to keep the grants in the PLOAM cells for the protected network terminal ONT1 synchronized on both networks PON-A and PON-B. The PLOAM signals received by the receiver part R-ONT1 of a protected optical network terminal ONT1 are handled as explained with reference to the grant signals GR1, GR2 shown in FIG. 5.

According to one aspect of the invention, protection is performed in such a way that no data cell is lost (or a maximum of one cell). This is obtained by overall synchronization, i.e. synchronization of grants, issued downstream, and synchronization of the received data cells in both directions, at the protection path selection points. In this embodiment, protection is provided for one or more ONTs in PONs that connect both protected and unprotected ONTs.

In the embodiment as described above, the protection switching arrangements in the OLT and in the ONT, respectively, allow the switching off of one PON, if necessary. This can be done within the time interval of one data cell within the data frame, since the data traffic on both PON-A and PON-B is transmitted and received synchronously in the present invention. As soon as differences occur, the protection switch can switch to use only the proper data transmitted over one of the PONs without (almost) any interruption of data traffic noticeable to the users.

The foregoing embodiments are merely illustrative of the principles of the invention. Those skilled in the art will be able to devise numerous arrangements, which, although not explicitly shown or described herein, nevertheless embody those principles that are within the scope of the invention. Accordingly, the embodiments shown and described herein are only meant to be illustrative and not limiting in any manner. The scope of the invention is limited only by the claims appended hereto.

We claim:

1. A terminal device for communicating data signals with a central communication device via a first data signal carrying line and a second data signal carrying line, the first data signal carrying line for transporting a first data signal and the second data signal carrying line for transporting a second data signal, the first and second data signals having equal content, the first data signal carrying line having a first signal propagation time and the second data signal carrying line having a second signal propagation time such that the first signal propagation time is shorter than the second signal propagation time, the terminal device including signal quality comparison means for determining a first signal quality of the first data signal and a second signal quality of the second data signal, for comparing the first and second signal qualities, and for accepting the one of the first and second data signals having better quality, the terminal device comprising:

a first data signal buffer for storing the first data signal during a first synchronization period in order to synchronize at least the reception of the first data signal and the second data signal.

2. The terminal device according to claim 1, wherein the first synchronization period equals the time difference between the second signal propagation time and the first signal propagation time.

3. The terminal device according to claim 1, further comprising:

a second data signal buffer for storing a third data signal during a second synchronization period to synchronize transmission of the third data signal with transmission of a fourth data signal, wherein the third data signal is transmitted via the first data signal carrying line and the fourth data signal is transmitted via the second data signal carrying line, and wherein the third and fourth data signals have equal content.

4. The terminal device according to claim 3, wherein the second synchronization period equals the time difference between the second signal propagation time and the first signal propagation time.

5. The terminal device according to claim 1, wherein the terminal device is a protected optical network terminal in a protected optical network architecture, and wherein the first data signal carrying line and the second data signal carrying line are optical network fibers.

6. The terminal device according to claim 1, wherein the central communication device includes a grant controller for controlling transmission of the first data signal from the terminal device by transmitting a first grant signal to the terminal device over the first data signal carrying line and for controlling transmission of the second data signal from the terminal device by transmitting a second grant signal to the terminal device over the second data signal carrying line, characterized in that, the grant controller transmits the first and second grant signals at substantially the same instant in time to the terminal device.

7. A method for communicating data signals between a terminal device and a central communication device via a first data signal carrying line and a second data signal carrying line, the first data signal carrying line for transporting a first data signal and the second data signal carrying line for transporting a second data signal, the first and second data signals having equal content, the first data signal carrying line having a first signal propagation time and the second data signal carrying line having a second signal propagation time such that the first signal propagation time is shorter than the second signal propagation time, the terminal device being operable for determining a first signal quality of the first data signal and a second signal quality of the second data signal, for comparing the first and second signal qualities, and for accepting the one of the first and second data signals having better quality, the method comprising:

receiving the first data signal from the central communication device;

storing the first data signal in a first data signal buffer;

receiving the second data signal from the central communication device; and holding the first data signal in the first data signal buffer during the first synchronization period to synchronize at least the reception of the first and the second data signals.

8. The method according to claim 7, further comprising:

storing a third data signal in a second data signal buffer;

transmitting a fourth data signal to the central communication device via the second data signal carrying line; and transmitting the third data signal to the central communication device via the first data signal carrying line after the second synchronization period in order to synchronize transmission of the third and fourth data signals.

* * * * *